No. 841,290. PATENTED JAN. 15, 1907.
F. WALTON.
WHEEL FOR MOTOR AND OTHER ROAD VEHICLES.
APPLICATION FILED MAR. 8, 1906.
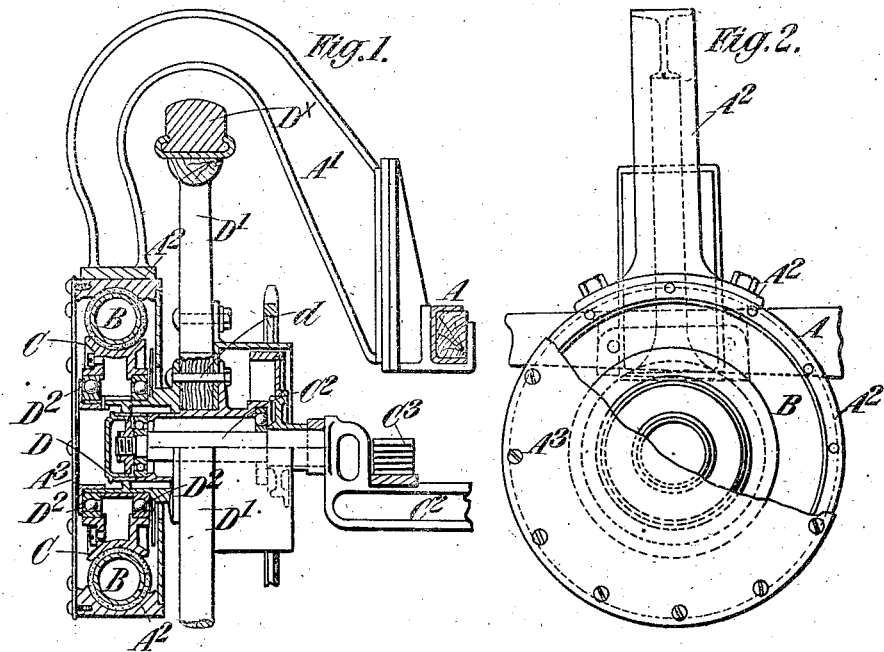
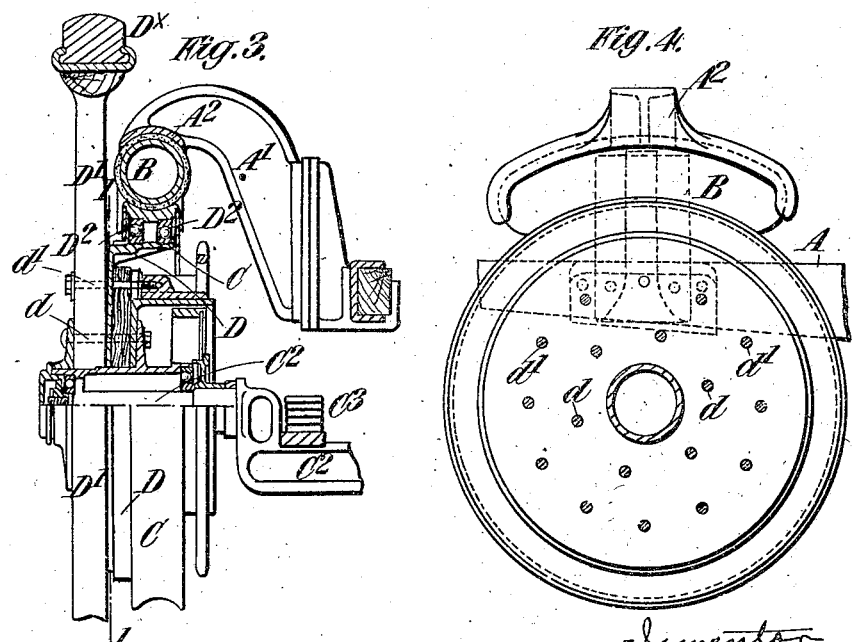
Witnesses
Inventor
By Frederick Walton
Knight Bros. attys

UNITED STATES PATENT OFFICE.

FREDERICK WALTON, OF LONDON, ENGLAND.

WHEEL FOR MOTOR AND OTHER ROAD VEHICLES.

No. 841,290.  Specification of Letters Patent.  Patented Jan. 15, 1907.

Application filed March 8, 1906. Serial No. 304,973.

*To all whom it may concern:*

Be it known that I, FREDERICK WALTON, engineer, a subject of the King of Great Britain, residing at 114 Holborn, London, England, have invented certain new and useful Improvements in or Relating to the Wheels of Motor and other Road Vehicles, of which the following is a specification.

This invention relates to the wheels of motor and other road vehicles, and has for its chief object to provide wheels possessing the advantages of those furnished with pneumatic tires without being attended by the disadvantages due to the liability of puncture and expense of repairing possessed by the latter type of wheels.

According to my invention I interpose a pneumatic or other resilient cushion between the body of the vehicle and a hollow cylindrical portion or ring supported laterally on the hub or other appropriate part of the wheel by an annular flange or the like attached thereto, ball-bearings or the like being provided between the said cylindrical portion or ring and the said flange, so as to enable the latter to revolve freely with the wheel without, however, revolving the cylindrical portion or ring. The body of the vehicle is preferably provided with brackets, having at their free ends casings or dished plates, which bear against the outer or upper surface of the said cushions under the weight of the vehicle.

The parts are preferably so arranged that the position of the cushion is on the outer side of the wheel in order to facilitate inspection or repair of the cushion and the parts appertaining thereto. The said parts may, however, in some cases be so arranged that the cushion occupies a position at the inner side of the wheel—that is to say, between the wheel and the vehicle-body.

In order that my said invention may be clearly understood and readily carried into effect, I will describe the same more fully with reference to the accompanying drawings, in which—

Figure 1 is a vertical section of a portion of a wheel constructed in accordance with my invention. Fig. 2 is a side elevation of the same. Fig. 3 is a vertical section similar to Fig. 1, but illustrates a modification. Fig. 4 is a vertical section on the line 1 1 of Fig. 3.

A is one of the side frames of the vehicle-body. A' is one of the brackets projecting laterally from said frame and having at its free end the casing or dished plate $A^2$. B is the pneumatic or other resilient cushion, upon the upper surface of which the said casing or dished plate $A^2$ bears.

C is the hollow cylindrical portion or ring which supports the cushion B.

D is the annular flange which is carried by the hub or other appropriate part of the road-wheel D' and which supports the ring C through the intervention of the ball-bearings $D^2$.

$C^2$ is the axle on which the road-wheel revolves, said axle (in the example illustrated) supporting the car-body by springs $C^3$ in the ordinary manner.

In the arrangement illustrated by Figs. 1 and 2 the cushion is of annular formation and situated on the outer side of the road-wheel, the parts being hidden from view by a detachable cover-plate $A^3$. In this case the casing $A^2$, which is bolted to the bracket A', extends completely around the cushion, and the bracket A' spans or extends over the road-wheel D' in order to reach the said casing $A^2$ and enable the weight of the vehicle-body to bear on the cushion. The annular flange D is connected with the hub of the wheel by bolts $d$. The said casing $A^2$ may be made slightly elliptical in shape in the horizontal direction and may also be made in two detachable parts, meeting on a horizontal line and suitably bolted or otherwise connected together with washers between the meeting parts.

In the arrangement shown in Figs. 3 and 4 the cushion is of segmental formation and situated on the inner side of the road-wheel D'. It occupies the upper portion of the ring C, and the dished plate $A^2$ is of segmental shape to correspond with that of the cushion. The bracket A' instead of spanning the road-wheel lies wholly on the inner side of the wheel—that is to say, between the vehicle-body and the wheel. In this case also the annular flange D is of greater diameter than that shown in Figs. 1 and 2 and is connected with the wheel by bolts $d'$. In other respects this arrangement is similar in construction to that illustrated in Figs. 1 and 2.

During the running of the vehicle the hollow cylindrical portion or ring C that supports the cushion remains stationary, the annular flange D on the road-wheel D' being free to revolve within it by means of the ball-bearings $D^2$. It will therefore be understood that the cushion B does not revolve, but remains approximately in the position represented in the drawings and absorbs the shocks which would otherwise be transmitted to the vehicle-body during its travel.

Although the rims of the road-wheels would preferably be provided with solid rubber tires $D^x$, as shown, it will be readily understood that irrespective of the nature of the tires themselves the vehicle will possess the advantages of pneumatic tires without the disadvantages of their being subjected to the wear and damage which result when they run in contact with the road.

Wheels such as hereinbefore described will last a considerable time without repair, and the cushions can be easily removed and replaced by others when necessary. Moreover, spare cushions when of the segmental form shown in Figs. 3 and 4 may be very conveniently carried on the vehicle for use in case of emergency, as they occupy less space than the peripheral pneumatic tires at present employed.

I do not desire to limit myself to the use of a pneumatic cushion of the annular and segmental shapes shown in the drawings, as the cushion could be composed of several hollow spherical bodies or of any other suitable contrivance possessing the requisite amount of resiliency. Instead of arranging the vehicle-springs between the axle and the body, as shown, I may arrange them between the cushions and the upper part of the casing or dished plate $A^2$.

I am aware that previous attempts have been made to arrange a pneumatic or other resilient cushion near the hub of a road-wheel with the object of enabling the ordinary pneumatic tires to be dispensed with; but so far as I am aware it has not before been proposed to arrange the cushion between the vehicle-body and a ring supported laterally on the road-wheel in such a manner that it and the said cushion do not revolve with the wheel.

What I claim, and desire to secure by Letters Patent of the United States, is—

1. In a road-vehicle, the combination with the wheel, of an annular flange adapted to revolve with the wheel, a ring supported by said flange and adapted to remain stationary with respect to the latter, a bracket connected with the vehicle-body, and a resilient cushion interposed between the bracket and the stationary ring for the purpose specified.

2. In a road-vehicle, the combination with the wheel, of an annular flange adapted to revolve with the wheel, a ring supported by said flange and adapted to remain stationary with respect to the latter, a bracket connected with the vehicle-body, and a pneumatic cushion interposed between the bracket and the stationary ring for the purpose specified.

3. In a road-vehicle, the combination with the wheel, of an annular flange adapted to revolve with the wheel, a ring supported by said flange and adapted to remain stationary with respect to the latter, a bracket connected with the vehicle-body, and a segmental pneumatic cushion interposed between the bracket and the stationary ring for the purpose specified.

4. In a road-vehicle, the combination with the wheel, of an annular flange adapted to revolve with the wheel, a ring supported on antifriction-bearings by said flange and adapted to remain stationary with respect to the latter, a bracket connected with the vehicle-body, and a resilient cushion interposed between the bracket and the stationary ring for the purpose specified.

5. In a road-vehicle, the combination with the wheel, of an annular lateral flange adapted to revolve with the wheel, a ring supported on antifriction-bearings by said flange and adapted to remain stationary with respect to the latter, a bracket connected with the vehicle-body, and a resilient cushion interposed between the bracket and the stationary ring for the purpose specified.

6. In a road-vehicle, the combination with the wheel, of an annular lateral flange adapted to revolve with the wheel, a ring supported on antifriction-bearings by said flange and adapted to remain stationary with respect to the latter, a bracket connected with the vehicle-body, a substantially annular casing connected with the free end of said bracket, and a resilient cushion interposed between the annular casing and the stationary ring for the purpose specified.

7. In a road-vehicle, the combination with the wheel, of an annular lateral flange adapted to revolve with the wheel, a ring supported on antifriction-bearings by said flange, and adapted to remain stationary with respect to the latter, a bracket connected with the vehicle-body, a substantially annular casing connected with the free end of said bracket and formed in detachable halves, and a resilient cushion interposed between the annular casing and the stationary ring for the purpose specified, In testimony whereof I have hereunto set my hand, in presence of two subscribing witnesses, this 19th day of February, 1906.

FREDERICK WALTON.

Witnesses:
T. SELBY WARDLE,
WALTER J. SKERTEN.